(12) United States Patent
Miike et al.

(10) Patent No.: US 12,145,590 B2
(45) Date of Patent: Nov. 19, 2024

(54) MERGING SUPPORT DEVICE, MERGING SUPPORT SYSTEM, MERGING SUPPORT METHOD, AND COMPUTER-READABLE MEDIUM

(71) Applicant: Panasonic Intellectual Property Management Co., Ltd., Osaka (JP)

(72) Inventors: Shintaro Miike, Tokyo To (JP); Masahito Oishi, Kanagawa Ken (JP); Yongxiang Wang, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 280 days.

(21) Appl. No.: 17/665,252

(22) Filed: Feb. 4, 2022

(65) Prior Publication Data
US 2022/0250623 A1 Aug. 11, 2022

(30) Foreign Application Priority Data

Feb. 8, 2021 (JP) ................................. 2021-018270

(51) Int. Cl.
*B60W 30/18* (2012.01)
*B60W 30/10* (2006.01)
*B60W 40/04* (2006.01)
*B60W 50/14* (2020.01)

(52) U.S. Cl.
CPC ...... *B60W 30/18163* (2013.01); *B60W 30/10* (2013.01); *B60W 40/04* (2013.01); *B60W 50/14* (2013.01); *B60W 2050/146* (2013.01); *B60W 2400/00* (2013.01); *B60W 2554/4043* (2020.02); *B60W 2554/4045* (2020.02); *B60W 2554/4046* (2020.02)

(58) Field of Classification Search
CPC .......... B60W 30/18163; B60W 30/10; B60W 40/04; B60W 50/14; B60W 2554/4043; B60W 2554/4045; B60W 2554/4046; B60W 2050/146; B60W 2400/00
USPC .......................................................... 701/41
See application file for complete search history.

(56) References Cited

U.S. PATENT DOCUMENTS

| | | | |
|---|---|---|---|
| 5,761,630 A * | 6/1998 | Sekine ................. | G05D 1/0289 701/301 |
| 8,214,125 B2 * | 7/2012 | Nanami ................ | B60W 40/04 475/275 |
| 9,550,528 B1 * | 1/2017 | Hakeem ............... | B62D 15/025 |
| 9,738,280 B2 * | 8/2017 | Rayes ................. | B60W 30/143 |
| 10,392,028 B1 * | 8/2019 | Hashimoto ........... | B60W 30/10 |
| 10,614,320 B2 * | 4/2020 | Yang ......................... | G06T 7/11 |

(Continued)

FOREIGN PATENT DOCUMENTS

JP 6353525 7/2018

*Primary Examiner* — Kurt Philip Liethen
*Assistant Examiner* — John D Bailey
(74) *Attorney, Agent, or Firm* — GREENBLUM & BERNSTEIN, P.L.C.

(57) ABSTRACT

A merging support device includes a memory and a hardware processor coupled to the memory. The hardware processor is configured to: execute control of the first vehicle corresponding to behavior when a second vehicle merges into a first lane, based on a vehicle speed and a vehicle position of a second vehicle traveling in a second lane that merges into a first lane in which a first vehicle is traveling; and notify a driver of the first vehicle about information on a control content of the first vehicle by the hardware processor.

17 Claims, 10 Drawing Sheets

(56) References Cited

U.S. PATENT DOCUMENTS

| | | | | |
|---|---|---|---|---|
| 10,725,475 B2* | 7/2020 | Yang | | G08G 1/167 |
| 10,913,462 B2* | 2/2021 | Sugiura | | B60W 30/18163 |
| 11,292,492 B2* | 4/2022 | Okuyama | | G08G 1/167 |
| 11,398,156 B2* | 7/2022 | Wang | | G08G 1/166 |
| 11,491,987 B1* | 11/2022 | Ward | | B60W 30/18163 |
| 11,572,099 B2* | 2/2023 | D'sa | | B60W 30/16 |
| 2007/0142995 A1* | 6/2007 | Wotlermann | | B60K 31/0008 |
| | | | | 701/96 |
| 2013/0099911 A1* | 4/2013 | Mudalige | | G08G 1/166 |
| | | | | 701/23 |
| 2014/0136414 A1* | 5/2014 | Abhyanker | | G06Q 20/3224 |
| | | | | 701/25 |
| 2015/0100216 A1* | 4/2015 | Rayes | | G01S 13/867 |
| | | | | 701/96 |
| 2016/0339919 A1* | 11/2016 | Habu | | B60W 10/18 |
| 2017/0305422 A1* | 10/2017 | Ito | | B60W 50/14 |
| 2017/0371349 A1* | 12/2017 | Kim | | G08G 1/096775 |
| 2018/0101998 A1* | 4/2018 | Pierce | | G06F 16/24565 |
| 2018/0120859 A1* | 5/2018 | Eagelberg | | B60W 60/00274 |
| 2018/0194363 A1* | 7/2018 | Sugiura | | B60W 50/0098 |
| 2019/0016345 A1* | 1/2019 | Kitagawa | | B60W 30/18163 |
| 2019/0051061 A1* | 2/2019 | Battles | | G05D 1/0088 |
| 2019/0126927 A1* | 5/2019 | Uejima | | G05D 1/0212 |
| 2019/0126928 A1* | 5/2019 | Sakaguchi | | B60W 10/06 |
| 2019/0248382 A1* | 8/2019 | Hashimoto | | B60W 60/0053 |
| 2019/0329778 A1* | 10/2019 | D'sa | | G06V 20/56 |
| 2020/0130711 A1* | 4/2020 | Turek | | G05D 1/0088 |
| 2020/0166945 A1* | 5/2020 | Kim | | B60W 50/00 |
| 2020/0192403 A1* | 6/2020 | Silver | | G01C 21/3602 |
| 2020/0247412 A1* | 8/2020 | Wang | | B60W 50/14 |
| 2020/0307600 A1* | 10/2020 | Sato | | G08G 1/167 |
| 2020/0369293 A1* | 11/2020 | Jeon | | B60W 40/08 |
| 2021/0107476 A1* | 4/2021 | Cui | | B60W 60/00276 |
| 2021/0188275 A1* | 6/2021 | Matsumura | | B60W 60/0053 |
| 2021/0237776 A1* | 8/2021 | Hashimoto | | B60W 40/09 |
| 2021/0263165 A1* | 8/2021 | Zheng | | G01S 19/04 |
| 2022/0001888 A1* | 1/2022 | Hashimoto | | B60W 40/06 |
| 2022/0107201 A1* | 4/2022 | Yagyu | | G08G 1/0968 |
| 2022/0204054 A1* | 6/2022 | Taniguchi | | G08G 1/167 |

* cited by examiner

MERGING SUPPORT DEVICE, MERGING SUPPORT SYSTEM, MERGING SUPPORT METHOD, AND COMPUTER-READABLE MEDIUM

CROSS-REFERENCE TO RELATED APPLICATIONS

This application is based upon and claims the benefit of priority from Japanese Patent Application No. 2021-018270, filed on Feb. 8, 2021, the entire contents of which are incorporated herein by reference.

FIELD

The present disclosure relates to a merging support device, a merging support system, a merging support method, and a computer-readable medium.

BACKGROUND

JP 6353525 B2 discloses a device for detecting the vehicle speed and vehicle position of a merging vehicle when the merging vehicle is traveling on an on-ramp that merges into a lane in which a host vehicle is traveling, and for adjusting the speed of the host vehicle on the basis of the detected speed and position.

The device is capable of automatically carrying out speed adjustment of the host vehicle by taking into account the vehicle speed and vehicle position of the merging vehicle, even when the speed of the host vehicle has been set, by an adaptive cruise control system which is on board the host vehicle, to a speed set by the driver.

However, in the conventional technology disclosed in JP 6353525 B2, when a merging vehicle merges into the lane in which a host vehicle is traveling, vehicle control such as speed adjustment of the host vehicle is performed using timing that is not intended by the driver of the host vehicle, and hence causes the driver anxiety.

Non-limiting modification examples of the present disclosure contribute to the provision of a merging support device, a merging support system, a merging support method, and computer-readable medium that enable a reduction in driver anxiety about vehicle control which is carried out when a merging vehicle merges.

SUMMARY

A merging support device according to an embodiment of the present disclosure includes a memory and a hardware processor coupled to the memory. The hardware processor is configured to: execute control of the first vehicle corresponding to behavior when a second vehicle merges into a first lane, based on a vehicle speed and a vehicle position of a second vehicle traveling in a second lane that merges into a first lane in which a first vehicle is traveling; and notify a driver of the first vehicle about information on a control content of the first vehicle by the hardware processor.

A merging support system according to an embodiment of the present disclosure includes: the above merging support device, and a center server that collects information on the vehicle speed and the vehicle position transmitted from the second vehicle and transmits the information to the first vehicle.

A merging support method according to an embodiment of the present disclosure includes: detecting vehicle speed and a vehicle position of a second vehicle traveling in a second lane that merges into a first lane in which a first vehicle is traveling; executing control of the first vehicle corresponding to behavior when the second vehicle merges into the first lane, based on the vehicle speed and vehicle position of the second vehicle; and notifying a driver of the first vehicle about information on the control content of the first vehicle.

DETAILED DESCRIPTION

A preferred embodiment of the present disclosure will be described in detail hereinbelow with reference to the accompanying drawings. Note that, in the present specification and drawings, redundant descriptions of components having substantially the same function configuration are omitted by assigning the same reference signs.

Embodiment

First, the background to the creation of the embodiment of the present disclosure will be described.

For example, the known technology disclosed in JP 6353525 B2 discloses a technology for detecting the vehicle speed and vehicle position of a merging vehicle when the merging vehicle is traveling on an on-ramp that merges into the lane in which a host vehicle is traveling, and for adjusting the speed of the host vehicle on the basis of the detected vehicle speed and vehicle position. In the known technology, the device is capable of automatically carrying out speed adjustment of the host vehicle by taking into account the vehicle speed and vehicle position of the merging vehicle, even when the speed of the host vehicle has been set, by an adaptive cruise control system which is on board the host vehicle, to a speed set by the driver.

However, the foregoing known technology has been confronted with the problem that, when a merging vehicle merges into the lane in which the host vehicle is traveling, vehicle control such as speed adjustment of the host vehicle is performed using timing that is not intended by the driver of the host vehicle, which causes the driver anxiety.

It is therefore desirable to be able to control the vehicle without causing the driver anxiety when a merging vehicle merges into the lane in which the host vehicle is traveling. An embodiment of this disclosure will be described hereinbelow.

Figure 1:
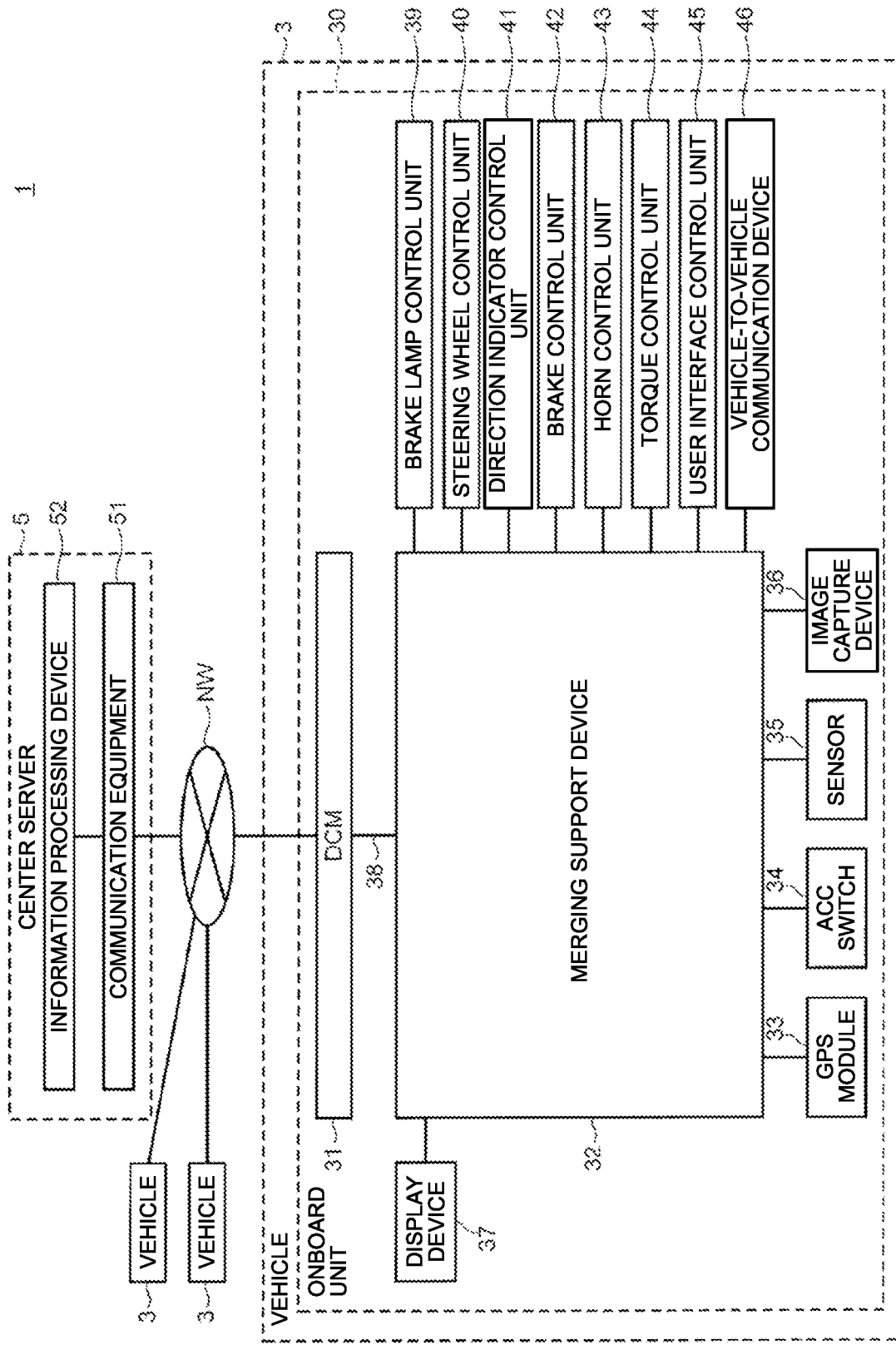
FIG. 1 is a diagram illustrating a configuration example of a merging support system 1 according to an embodiment of the present disclosure.

FIG. 1 is a diagram illustrating a configuration example of a merging support system 1 according to an embodiment of the present disclosure.

Merging Support System 1

The merging support system 1 is equipped with an onboard unit 30 which is on board each of a plurality of vehicles 3, and a center server 5 that can communicate with the onboard unit 30. The center server 5 is a device that manages the information transmitted between the plurality of vehicles 3.

Onboard Unit 30

The onboard unit 30 is equipped with a DCM (Data Communication Module) 31, a merging support device 32, a GPS (Global Positioning System) module 33, an ACC (Adaptive Cruise Control) switch 34, a sensor 35, an image capture device 36, and a display device 37.

The onboard unit 30 is also equipped with a brake lamp control unit 39, a steering wheel control unit 40, a direction indicator control unit 41, a brake control unit 42, a horn control unit 43, a torque control unit 44, a user interface control unit 45, and a vehicle-to-vehicle communication device 46.

Note that, in addition to the foregoing, the onboard unit 30 also includes, for example, a car navigation device, an audio device, an inverter, a motor, and auxiliary equipment, and the like.

DCM 31

The DCM 31 is communication equipment that performs bidirectional communication with the center server 5 via a communication network NW. The communication network NW is, for example, a mobile phone network terminating in multiple base stations, or a satellite communication network using communication satellites.

The DCM 31 is connected to the merging support device 32 through a CAN (Controller Area Network) 38, which is an onboard network, so as to enable mutual communication, and transmits various information to the center server 5 in response to requests from the merging support device 32. Note that, in addition to the CAN 38, the DCM 31 may be connected to the merging support device 32 through a network of other standards such as Ethernet (registered trademark).

Merging Support Device 32

The merging support device 32 is an electronic control unit that collects vehicle information and performs various control processes related to predetermined functions in the vehicle 3, and is a motor ECU (Electronic Control Unit), a hybrid ECU, or an engine ECU, or the like, for example.

Vehicle information includes information such as vehicle position, vehicle speed, vehicle status, and image capture data.

Vehicle position information is latitude and longitude information indicating the position where the vehicle 3 is located, for example, which is transmitted from a car navigation device, the GPS module 33, or the like.

The vehicle speed information is information indicating the current speed of the vehicle 3, which is transmitted from a vehicle speed sensor.

Vehicle status information is information indicating the state of the vehicle such as the state of the ACC switch 34, the accelerator pedal opening degree, the brake depression amount, and the amount of steering of the steering wheel, for example.

Image capture data is the data of the image captured by the image capture device 36. The image capture data contains time information indicating the time when the image was generated.

Image Capture Device 36

The image capture device 36 is a camera equipped with an image capture element such as a CCD (Charge Coupled Device) or CMOS (Complementary Metal Oxide Semiconductor). The image capture device 36 includes, for example, an external image capture device that captures images of the outside of the vehicle.

The external image capture device is an omni-directional camera or a panoramic camera, or the like, which captures images of the scenery around the vehicle. The scenery around the vehicle is, for example, the scenery in front of the vehicle 3, the scenery to the side of the vehicle 3, and the scenery behind the vehicle 3. The scenery includes, for example, the roadway on which the vehicle 3 is travelling, objects on the roadway, a footpath facing the roadway, and objects on the footpath, and the like.

GPS Module 33

The GPS module 33 receives GPS signals transmitted from satellites and locates the position of the vehicle 3 in which the GPS module 33 is installed. The GPS module 33 is communicably connected to the merging support device 32 via the CAN 38. The vehicle position information, which indicates the position of the vehicle 3 measured by the GPS module 33, is transmitted to the merging support device 32.

ACC Switch 34

The ACC switch 34 is a switch that is used to turn on or turn off the adaptive cruise control function, which is a travel support function that allows the vehicle 3 to follow the vehicle ahead while maintaining the vehicle-to-vehicle distance from the vehicle 3 to the vehicle ahead.

Sensor 35

The sensor 35 is a sensor for detecting the voltage applied to an inverter which is on board the vehicle 3, a sensor for detecting the voltage applied to a motor, a vehicle speed sensor for detecting the vehicle speed, an accelerator pedal opening degree sensor for detecting the accelerator pedal opening degree, a steering amount sensor for detecting the steering wheel steering amount, a brake operation amount sensor for detecting the brake operation amount, and a distance detection sensor for detecting the distance from the vehicle 3 to objects existing around the vehicle 3, or the like.

The information outputted from the sensor 35 is captured by the merging support device 32 via the CAN 38.

Display Device 37

The display device 37 is a center display, a meter panel or a head-up display, or the like, provided in the cabin.

Brake Lamp Control Unit 39

The brake lamp control unit 39 turns on the brake lamp by supplying current to the brake lamp and turns off the brake lamp by stopping the supply of current to the brake lamp.

Control Example 1 using Brake Lamp Control Unit 39

Upon receiving a brake pedal operation amount signal, which is transmitted from the brake operation amount sensor, the merging support device 32 generates a brake operation signal and transmits the brake operation signal to the brake lamp control unit 39.

Having received the brake operation signal, the brake lamp control unit 39 turns on the brake lamp by supplying current to the brake lamp. Thus, the vehicle behind can be informed that the vehicle 3 is decelerating.

Control Example 2 using Brake Lamp Control Unit 39

Upon receiving a distance signal, which is transmitted from the distance detection sensor, the merging support device 32 measures vehicle-to-vehicle distance between the vehicle 3 and the vehicle ahead on the basis of the distance signal.

When the vehicle-to-vehicle distance is shorter than a set distance which is set using the adaptive cruise control function, the merging support device 32 transmits a brake operation signal to the brake lamp control unit 39.

Having received the brake operation signal, the brake lamp control unit 39 turns on the brake lamp by supplying current to the brake lamp. Thus, the vehicle behind can be informed that the vehicle 3 is decelerating.

Steering Wheel Control Unit 40

The steering wheel control unit 40 performs control of the steering angle of the vehicle front wheels in response to a steering wheel operation by the driver, steering wheel control using the lane keeping assist function, and collision avoidance support control, and the like.

The lane keeping assist function is a travel support function that helps the vehicle 3 to travel along its lane.

Control Example 1 using Steering Wheel Control Unit 40

When the lane keeping assist function is turned on, the merging support device 32 specifies the boundary of the lane along which the vehicle 3 is traveling using a known lane boundary specifying method, and determines whether the vehicle 3 has deviated from the vicinity of the center of the lane on the basis of the specified lane boundary and vehicle position information transmitted from the GPS module 33.

When it is determined that the vehicle 3 has deviated from the vicinity of the center of the lane, the merging support device 32 transmits a steering signal to the steering wheel control unit 40 to correct the vehicle position.

Upon receipt of the steering signal, the steering wheel control unit 40 adjusts the amount of rotation of the steering wheel to correct the vehicle position to around the center of the lane, on the basis of the steering signal.

Control Example 2 using Steering Wheel Control Unit 40

The merging support device 32 determines, using a known collision avoidance support method, whether the vehicle 3 is likely to collide with other vehicles, on the basis of the vehicle speed and vehicle position transmitted by other vehicles in the vicinity of the vehicle 3.

Other vehicles are vehicles ahead of vehicle 3, merging vehicles, and the like. A merging vehicle is a vehicle traveling in a merging lane which joins the lane in which the vehicle 3 is traveling.

When there is a possibility of a collision, the merging support device 32 transmits a steering signal to the steering wheel control unit 40 to execute a lane change of the vehicle 3.

Having received the steering signal, the steering wheel control unit 40 adjusts the amount of rotation of the steering wheel so as to change the lane of the vehicle 3 on the basis of the steering signal.

Notification Example 1 for Vehicle Behind, or the like, Upon Deviation from Lane Note that the merging support device 32 may be configured to transmit the direction indicator flashing signal to the direction indicator control unit 41 before transmitting the steering signal to execute the lane change of the vehicle 3 to the steering wheel control unit 40. The direction indicator flashing signal is a signal transmitted by a direction indication operating lever (not illustrated) when the direction indication operating lever is operated. The details of the configuration of the direction indicator control unit 41 are described below.

Thus, a lane change can be carried out after notifying the vehicle behind vehicle 3, or the like, that a lane change of vehicle 3 is being initiated.

Notification Example 2 to Driver Upon Deviation from Lane

Note that, when the lane keeping assist function is turned on, the merging support device 32 may be configured to determine whether the vehicle 3 has deviated from the lane and, when the vehicle 3 has deviated from the lane, to transmit a warning signal to the steering wheel control unit 40 to warn that the vehicle 3 has deviated from the lane.

In this case, having received the warning signal, the steering wheel control unit 40 vibrates the steering wheel on the basis of the warning signal. Thus, the driver can be informed that the vehicle 3 is deviating from the lane.

Notification Example 3 to Driver Upon Deviation from Lane

Note that, when the lane keeping assist function is turned on, the merging support device 32 may be configured to determine whether the vehicle 3 has deviated from the lane, and when the vehicle 3 has deviated from the lane, to transmit the aforementioned warning signal to the steering wheel control unit 40 and transmit this signal to the display device 37 and a loudspeaker driver device (not illustrated).

Having received the warning signal, the display device 37 displays a warning message on the screen of the display device 37, on the basis of the warning signal. Having received the warning signal, the loudspeaker driver device plays a warning message from the loudspeaker on the basis of the warning signal. The warning message in this case is, for example, "You are deviating from the lane," or the like.

Direction Indicator Control Unit 41

The direction indicator control unit 41 controls the flashing of the direction indicator (not illustrated).

Control Example using Direction Indicator Control Unit 41

For example, when the direction indication operating lever is operated by a driving operation, the direction indicator control unit 41 specifies the direction of travel of the vehicle 3 on the basis of the direction indication signal transmitted from the direction indication operating lever, and transmits a direction indicator flashing signal to the direction indicator control unit 41 to cause the direction indicator, which is in a position corresponding to the specified direction of travel, to flash.

Having received the direction indicator flashing signal, the direction indicator control unit 41 causes the direction indicator to flash on the basis of the direction indicator flashing signal. Thus, the vehicle behind the vehicle 3, and the like, can be informed of changes in the behavior of the vehicle 3.

Brake Control Unit 42

The brake control unit 42 controls the braking force of a brake device (not illustrated).

Control Example 1 Using Brake Control Unit 42

Upon receiving an operation amount signal of the brake pedal, which is transmitted from the brake operation amount sensor, the merging support device 32 generates a brake operation signal to generate a braking force corresponding to the operation amount of the brake pedal and transmits the brake operation signal to the brake control unit 42.

Having received the brake operation signal, the brake control unit 42 controls the hydraulic pressure of a brake device (not illustrated) so as to generate a braking force corresponding to the brake pedal operation amount.

Thus, brake pads provided to the brake device (not illustrated) press against the brake rotors, thereby producing a braking force corresponding to the amount of brake pedal operation.

Control Example 2 Using Brake Control Unit 42

The merging support device 32 receives the distance signal transmitted from the distance detection sensor and acquires information on the vehicle-to-vehicle distance between the vehicle 3 and the vehicle ahead.

When the vehicle-to-vehicle distance is shorter than a set distance, which is set using the adaptive cruise control function, the merging support device 32 generates a braking operation signal that generates a braking force that brings the vehicle-to-vehicle distance back to the set distance. The merging support device 32 transmits the generated brake operation signal to the brake control unit 42.

Having received the brake operation signal, the brake control unit 42 controls the hydraulic pressure of a brake device (not illustrated) such that the vehicle-to-vehicle distance returns to the set distance on the basis of the brake operation signal, thereby generating the desired braking force.

Horn Control Unit 43

The horn control unit 43 generates a horn sound from a horn-generating horn.

Control Example 1 Using Horn Control Unit 43

When a horn switch provided to the steering wheel is pressed by the driver, the merging support device 32 receives a horn operation signal transmitted from the horn switch and generates a horn sound generation signal to generate a horn sound on the basis of the received horn operation signal. The merging support device 32 transmits the generated horn sound generation signal to the horn control unit 43.

Having received the horn sound generation signal, the horn control unit 43 generates a high-frequency signal on the basis of the horn sound generation signal, and transmits the signal to the horn.

Having received the high-frequency signal, the horn controls a current flowing in the coil built into the horn on the basis of the high-frequency signal, thereby causing the vibrating unit built into the horn to vibrate. A horn sound is thus generated.

Control Example 2 using Horn Control Unit 43

The merging support device 32 receives the distance signal transmitted from the distance detection sensor and measures the vehicle-to-vehicle distance between the vehicle 3 and the vehicle ahead on the basis of the distance signal.

When the vehicle-to-vehicle distance becomes shorter in a shorter time than the set distance set by the adaptive cruise control function, the merging support device 32 determines that the vehicle ahead of vehicle 3 has applied emergency braking or that the merging vehicle has made an unreasonable interruption.

In this case, the merging support device 32 generates a horn sound generation signal which generates a horn sound and transmits the generated horn sound generation signal to the horn control unit 43.

Having received the horn sound generation signal, the horn control unit 43 generates a high-frequency signal on the basis of the horn sound generation signal, and transmits the signal to the horn. A horn sound is thus generated as mentioned earlier.

Torque Control Unit 44

The torque control unit 44 controls the speed of the vehicle 3.

Control Example 1 Using Torque Control Unit 44

Upon receiving an accelerator pedal opening degree signal transmitted from the accelerator pedal opening degree sensor, the merging support device 32 generates a torque signal that generates a torque corresponding to the accelerator pedal opening degree and transmits the generated torque signal to the torque control unit 44.

Having received the torque signal, the torque control unit 44 controls the output torque and speed of the internal combustion engine by controlling the throttle valve, fuel injection valve, and the like, of the internal combustion engine on the basis of the torque signal.

Control Example 2 Using Torque Control Unit 44

The merging support device 32 receives the distance signal transmitted from the distance detection sensor and acquires information on the vehicle-to-vehicle distance between the vehicle 3 and the vehicle ahead.

The merging support device 32 generates a torque signal which generates a torque such that the vehicle-to-vehicle distance is maintained at the set distance set by the adaptive cruise control function, and transmits the generated torque signal to the torque control unit 44.

Having received the torque signal, the torque control unit 44 controls the output torque and speed of the internal combustion engine by controlling the throttle valve, fuel injection valve, and the like, of the internal combustion engine on the basis of the torque signal.

Note that the control target of the torque control unit 44 is not limited to an internal combustion engine, and may also be a motor.

User Interface Control Unit 45

When an operation with respect to the user interface is performed, the user interface control unit 45 executes various controls corresponding to the operation content on the basis of the operation signal indicating the operation content.

The user interface is, for example, a joystick or a touch screen, or the like, which is on board the vehicle 3.

Vehicle-to-Vehicle Communication Device 46

The vehicle-to-vehicle communication device 46 is vehicle-to-everything (V2X) communication equipment or the like that communicates wirelessly with other vehicles that are present around the vehicle 3.

V2X is a communication technology that connects cars to various objects. V2X includes communication such as V2V (Vehicle to Vehicle), V2P (Vehicle to Pedestrian), V2I (Vehicle to Infrastructure) and V2N (Vehicle to Network) communication.

Center Server 5

The center server 5 is a server which collects information from a plurality of vehicles 3 and provides various services by distributing the information. The center server 5 is equipped with communication equipment 51 and an information processing device 52.

The communication equipment 51 is a communication device which, under the control of the information processing device 52, performs bidirectional communication with each of a plurality of vehicles 3 via a communication network NW.

The information processing device 52 executes various control processes in the center server 5. The information processing device 52 is configured from a server computer that includes, for example, a central processing unit (CPU), a random-access memory (RAM), a read-only memory (ROM), an auxiliary storage device, an input/output interface, and the like.

Figure 2:
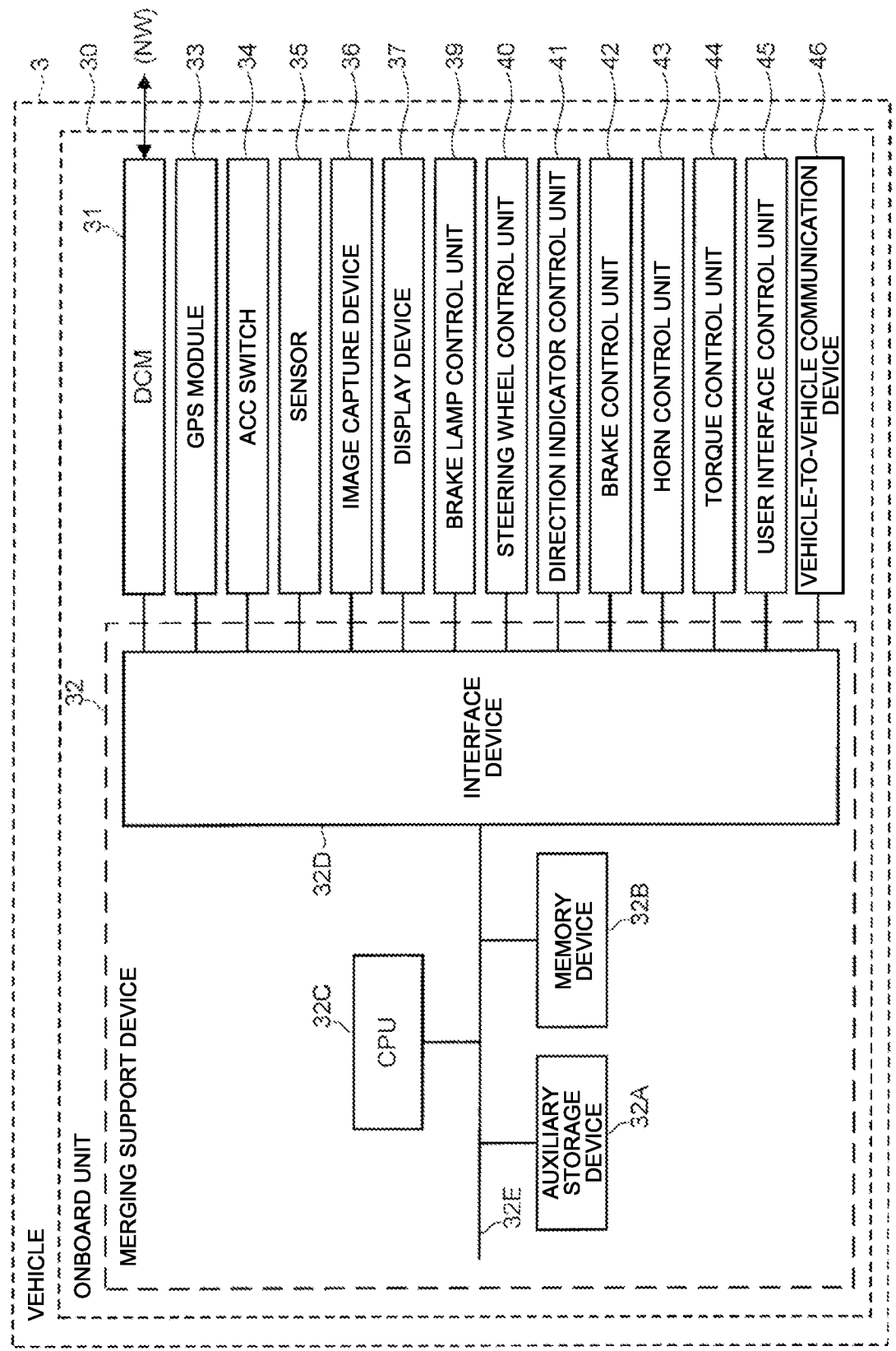
FIG. 2 is a diagram illustrating a hardware configuration example of a merging support device 32.

Next, referring to FIG. 2, the hardware configuration of the merging support device 32 is described. FIG. 2 is a diagram illustrating a hardware configuration example of the merging support device 32.

The merging support device 32 is equipped with an auxiliary storage device 32A, a memory device (memory) 32B, a CPU (hardware processor) 32C and an interface device 32D.

The auxiliary storage device 32A, the memory device 32B, the CPU 32C, and the interface device 32D are connected to each other by a bus line 32E.

Auxiliary Storage Device 32A

The auxiliary storage device 32A stores files, data, and the like necessary for the processing of the merging support device 32. The auxiliary storage device 32A is configured from a hard disk drive (HDD), flash memory, and the like.

Memory Device 32B

The memory device 32B reads and stores a program from the auxiliary storage device 32A when there is an instruction to start the program, and temporarily stores the data used by the program.

CPU 32C

The CPU 32C executes the program stored in the memory device 32B and realizes various functions of the merging support device 32 according to the program.

Interface Device 32D

The interface device 32D is the interface that connects the CPU 32C to the DCM 31.

The interface device 32D also connects the image capture device 36, the sensor 35, and the like, to the DCM 31 via the CAN 38.

The functions of the merging support device 32 will be described next with reference to FIGS. 3 and 4.

Figure 3:
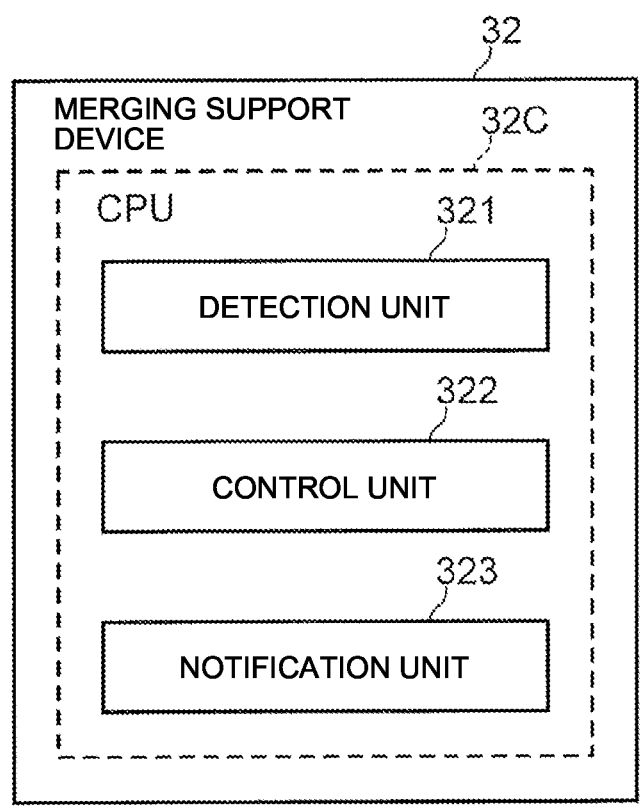
FIG. 3 is a diagram illustrating a configuration example of the merging support device 32.
Figure 4:
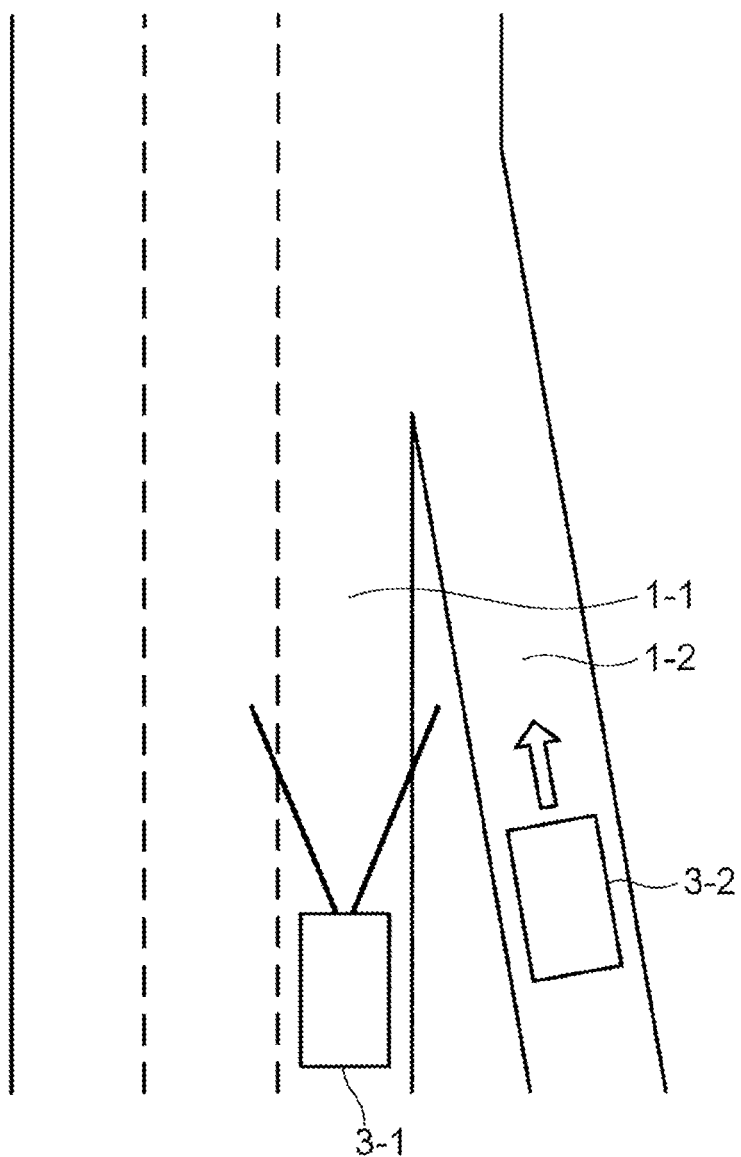
FIG. 4 is a diagram to illustrate functions of the merging support device 32.

FIG. 3 is a diagram illustrating a configuration example of the merging support device 32, and FIG. 4 is a diagram to illustrate functions of the merging support device 32.

FIG. 4 illustrates a first vehicle 3-1 and a second vehicle 3-2. The first vehicle 3-1 and the second vehicle 3-2 are each equipped with the onboard unit 30 illustrated in FIG. 1, which is configured to enable vehicle-to-vehicle communication.

The first vehicle 3-1 is a vehicle travelling in a first lane 1-1. The first lane 1-1 is, for example, the overtaking lane of a highway.

Note that the first lane 1-1 is not limited to the overtaking lane of a highway, and may also be a travel lane other than the overtaking lane of a highway, a travel lane of a public road, a travel lane of a bypass road, or the like.

The second vehicle 3-2 is a merging vehicle traveling in the second lane 1-2. The second lane 1-2 is a lane that merges into the first lane 1-1.

In the following, the second vehicle 3-2 may be referred to as the "merging vehicle" and the second lane 1-2 may be referred to as the "merging lane".

As illustrated in FIG. 3, the merging support device 32 is equipped with a detection unit 321, a control unit 322 and a notification unit 323.

Detection Unit 321

The detection unit 321 detects the vehicle speed and vehicle position of the merging vehicle.

For example, upon receiving vehicle information transmitted using wireless communication from a merging vehicle, the vehicle-to-vehicle communication device 46 illustrated in FIG. 1 forwards the received vehicle information to the detection unit 321.

The vehicle information includes information such as the vehicle speed, vehicle position, acceleration, steering amount, and vehicle type of the merging vehicle.

The detection unit 321 detects at least the vehicle speed and vehicle position of the merging vehicle in the received vehicle information, and transmits the detected information on the vehicle speed and vehicle position to the control unit 322.

Thus, by using the vehicle information received by the vehicle-to-vehicle communication device 46, the detection unit 321 is capable of detecting the vehicle speed and vehicle position of the merging vehicle even when the image capture device 36, radar (not illustrated), and the like, which are on board the first vehicle 3-1 are not functioning due to bad weather.

Even when, for example, the vehicle speed and the vehicle position of the merging vehicle cannot be detected by the image capture device 36, the radar (not illustrated), or the like, on board the first vehicle 3-1 because a sound barrier or the like is installed between the first lane 1-1 and the merging lane, the detection unit 321 is capable of detecting the vehicle speed and the vehicle position of the merging vehicle by using the vehicle information received by the vehicle-to-vehicle communication device 46.

Control Unit 322

The control unit 322 executes the control of the first vehicle 3-1 corresponding to the behavior when the merging vehicle merges into the first lane 1-1, on the basis of the vehicle speed and vehicle position of the merging vehicle detected by the detection unit 321.

The behavior of the merging vehicle upon merging into the first lane 1-1 includes the acceleration, deceleration and change of direction of the merging vehicle.

The control of the first vehicle 3-1 corresponding to the behavior includes acceleration, deceleration, lane changes, brake control, lighting of brake lamp and horn output, and the like.

An example of the control of the first vehicle 3-1 corresponding to the behavior when the merging vehicle merges into the first lane 1-1 is described hereinbelow.

Control Example 1 using Control Unit 322

For example, the control unit 322 calculates, on the basis of the vehicle speed of the first vehicle 3-1, the vehicle position of the first vehicle 3-1, the vehicle speed of the merging vehicle, and the vehicle position of the merging vehicle, a first arrival time of the first vehicle 3-1 at the merging point of the first lane 1-1 and the merging lane, and a second arrival time of the merging vehicle at the merging point.

As a result of comparing the calculated first arrival time with the second arrival time, when, for example, the first arrival time is a predetermined time or more earlier than the second arrival time and the vehicle speed of the first vehicle 3-1 is 5 km/h or more higher than the vehicle speed of the merging vehicle, the control unit 322 determines that the merging vehicle can safely merge after the first vehicle 3-1.

In this case, the control unit 322 transmits a torque signal to the torque control unit 44 illustrated in FIG. 1, which keeps the vehicle speed of the first vehicle 3-1 constant.

Further, the control unit 322 transmits, to the steering wheel control unit 40 illustrated in FIG. 1, a steering signal which maintains the current steering wheel control without changing the steering angle of the first vehicle 3-1.

Control Example 2 Using Control Unit 322

As a result of the above comparison between the first arrival time and the second arrival time, when the first arrival time is later than the second arrival time by a predetermined time or more and the vehicle speed of the first vehicle 3-1 is 5 km/h or more lower than the vehicle speed of the merging vehicle, for example, the control unit 322 determines that the merging vehicle can safely merge in front of the first vehicle 3-1.

In this case also, the control unit 322 transmits a torque signal to the torque control unit 44 illustrated in FIG. 1 to keep the vehicle speed of the first vehicle 3-1 constant, and also transmits, to the steering wheel control unit 40 illustrated in FIG. 1, a steering signal which maintains the current steering wheel control.

Control Example 3 Using Control Unit 322

As a result of the above comparison between the first arrival time and the second arrival time, the control unit 322 determines that it is necessary for the first vehicle 3-1 to accelerate when, for example, the first arrival time is a predetermined time or more earlier than the second arrival time but the merging vehicle starts to accelerate after the second arrival time is calculated.

In this case, in order to temporarily increase the vehicle speed of the first vehicle 3-1, the control unit 322 generates a torque signal which generates a torque greater than the torque corresponding to the accelerator pedal opening degree, and transmits the generated torque signal to the torque control unit 44 illustrated in FIG. 1.

Furthermore, upon determining that the vehicle-to-vehicle distance after merging is shorter than a predetermined value even when the torque is also increased, the control unit 322 transmits a steering signal to the steering wheel control unit 40 illustrated in FIG. 1 to execute a lane change of the first vehicle 3-1.

In this case, before transmitting the steering signal to the steering wheel control unit 40, the control unit 322 transmits a direction indicator flashing signal to the direction indicator control unit 41 illustrated in FIG. 1 in order to cause the direction indicator corresponding to the steering direction to flash.

Control Example 4 Using Control Unit 322

As a result of the above comparison between the first arrival time and the second arrival time, the control unit 322 determines that it is necessary to cause the first vehicle 3-1 to decelerate when, for example, the first arrival time is later than the second arrival time by a predetermined time or more, but the merging vehicle starts to decelerate after the second arrival time is calculated.

In this case, the control unit 322 generates a torque signal which generates a torque smaller than the torque corresponding to the accelerator pedal opening degree in order to temporarily reduce the vehicle speed of the first vehicle 3-1, and transmits the generated torque signal to the torque control unit 44 illustrated in FIG. 1.

Furthermore, upon determining that the vehicle-to-vehicle distance after merging is shorter than a predetermined value even when the torque is reduced, the control unit 322 uses the distance detection sensor to determine whether there is a vehicle behind within a predetermined distance backward from the vehicle 3.

When there is no vehicle behind, the control unit 322 generates a brake operation signal to generate a braking force and transmits a brake operation signal to the brake control unit 42 illustrated in FIG. 1.

When there is a vehicle behind, the control unit 322 determines whether there are other vehicles 3 in the adjacent lane.

When no other vehicle 3 is present, the control unit 322 transmits, to the steering wheel control unit 40 illustrated in FIG. 1, a steering signal to execute a lane change for the first vehicle 3-1.

In this case, before transmitting the steering signal to the steering wheel control unit 40, the control unit 322 transmits a direction indicator flashing signal to the direction indicator control unit 41 illustrated in FIG. 1 in order to cause the direction indicator corresponding to the steering direction to flash.

When there is a vehicle behind and another vehicle in the adjacent lane, the control unit 322 generates a horn operation signal and transmits the generated horn sound generation signal to the horn control unit 43 illustrated in FIG. 1. Thus, a merging vehicle can be alerted.

Note that, even when, for example, the driver of the first vehicle 3-1 cannot see the merging vehicle traveling in the merging lane because a sound barrier or the like is installed between the first lane 1-1 and the second lane 1-2 illustrated in FIG. 4, the control unit 322 can control the first vehicle 3-1 on the basis of the vehicle information received using the vehicle-to-vehicle communication.

Notification Unit 323

The notification unit 323 notifies the driver of the first vehicle of information about the control content of the first vehicle 3-1 by the control unit 322.

Information about the control content is, for example, the lighting of the brake lamp, the output of the horn, the flashing of the direction indicators, steering of the steering wheel, changes in vehicle speed, and the application of the brakes, and the like.

Information Notification Example 1 by Notification Unit 323

Before the control of the first vehicle 3-1 is initiated, the notification unit 323 gives notification of information about the control content of the first vehicle 3-1.

For example, suppose that the control unit 322 generates a torque signal that generates a torque greater than the torque corresponding to the accelerator pedal opening degree operated by the driver in order to increase the vehicle speed of the first vehicle 3-1.

In this case, on the basis of the torque signal, the notification unit 323 reads guidance data such as, for example, "Accelerate because a merging vehicle is approaching" or "Accelerate to increase the vehicle-to-vehicle distance to the merging vehicle" from the memory device 32B and transmits the guidance data to the display device 37 illustrated in FIG. 1 and to the loudspeaker driver device (not illustrated).

Thus, the guidance is displayed on the display device 37, and the guidance is played back from the loudspeaker driver device (not illustrated). As a result, even when the first vehicle 3-1 accelerates using timing that is not intended by the driver, the driver is able to concentrate on driving the first vehicle 3-1 without causing the driver anxiety.

Moreover, suppose that, in order to reduce the vehicle speed of the first vehicle 3-1, the control unit 322 generates a torque signal that generates a torque that is smaller than the torque corresponding to the accelerator pedal opening degree. In this case, on the basis of the torque signal, the notification unit 323 reads guidance data such as, for example, "Decelerate because a merging vehicle is approaching" or "Decelerate to increase the vehicle-to-vehicle distance between the vehicle and the merging vehicle" from the memory device 32B and transmits the guidance data to the display device 37 illustrated in FIG. 1 and the loudspeaker driver device (not illustrated).

Thus, the guidance is displayed on the display device 37, and the guidance is played back from the loudspeaker driver device (not illustrated). As a result, even when the first vehicle 3-1 decelerates using timing that is not intended by the driver, the driver is able to concentrate on driving the first vehicle 3-1 because the driver is not caused any anxiety.

Furthermore, suppose that the control unit 322 generates a steering signal in order to execute a lane change for the first vehicle 3-1. In this case, on the basis of the steering signal, the notification unit 323 reads guidance data such as, for example, "Change lane because merging vehicle is approaching", from the memory device 32B and transmits the guidance data to the display device 37 illustrated in FIG. 1 and the loudspeaker driver device (not illustrated).

Thus, the guidance is displayed on the display device 37, and the guidance is played back from the loudspeaker driver device (not illustrated). As a result, even when the first vehicle 3-1 changes lanes using timing that is not intended by the driver, the driver is able to concentrate on driving the first vehicle 3-1 because the driver is not caused any anxiety.

Furthermore, as mentioned earlier, even when the merging vehicle cannot be visually seen by the driver of the first vehicle 3-1, the notification unit 323 can give notification of the the control content of the first vehicle 3-1 before the control of the first vehicle 3-1 is initiated.

Information Notification Example 2 by Notification Unit 323

The notification unit 323 may be configured to give notification of information about the control content of the first vehicle 3-1 after the control of the first vehicle 3-1 has been initiated.

For example, immediately after the vehicle speed of the first vehicle 3-1 changes, the notification unit 323 reads guidance data such as "We have accelerated due to merging vehicle approaching" from the memory device 32B and transmits the guidance data to the display device 37 illustrated in FIG. 1 and the loudspeaker driver device (not illustrated).

Thus, the guidance is displayed on the display device 37, and the guidance is played back from the loudspeaker driver device (not illustrated). As a result, the driver is able to concentrate on driving the first vehicle 3-1 in the knowledge that the control of the first vehicle 3-1 that accompanies the merging of a merging vehicle has been executed.

Information Notification Example 3 by Notification Unit 323

The notification unit 323 may be configured to give notification of information indicating that control of the first vehicle 3-1 has been interrupted when, after the control of the first vehicle 3-1 has been initiated, the control of the first vehicle 3-1 is interrupted.

For example, when another vehicle other than the merging vehicle interrupts driving after the vehicle speed of the first vehicle 3-1 has been changed by the control by the control unit 322, the control unit 322 interrupts the control of the vehicle speed.

In this case, the notification unit 323 reads guidance data such as, for example, "Acceleration control for merging has been interrupted," from the memory device 32B and transmits the guidance data to the display device 37 illustrated in FIG. 1 and the loudspeaker driver device (not illustrated).

Thus, the guidance is displayed on the display device 37, and the guidance is played back from the loudspeaker driver device (not illustrated). As a result, the driver is able to concentrate on driving the first vehicle 3-1 in the knowledge that the control of the first vehicle 3-1 that accompanies the merging of a merging vehicle has been interrupted.

Information Notification Example 4 by Notification Unit 323

The notification unit 323 may be configured to give notification of information indicating that an operation by the driver of the first vehicle 3-1 has intervened when the operation intervenes after the control of the first vehicle 3-1 has been initiated.

For example, when the steering wheel operation by the driver intervenes immediately after the lane change of the first vehicle 3-1 is automatically initiated due to the merging of the merging vehicle, the notification unit 323 reads guidance data such as, for example, "lane change interrupted due to detected steering wheel operation" from the memory device 32B and transmits the guidance data to the display device 37 illustrated in FIG. 1 and the loudspeaker driver device (not illustrated).

Thus, the guidance is displayed on the display device 37, and the guidance is played back from the loudspeaker driver device (not illustrated). As a result, the driver can ascertain that the control of the first vehicle 3-1 that accompanies the merging of a merging vehicle has been interrupted by a driver operation.

Information Notification Example 5 by Notification Unit 323

The notification unit 323 may be configured to notify the driver of the first vehicle 3-1 that an operation by the driver is necessary when, after the control of the first vehicle 3-1 has been initiated, it is determined that the operation by the driver of the first vehicle 3-1 is necessary.

For example, when another vehicle other than the merging vehicle interrupts driving after the vehicle speed of the first vehicle 3-1 has been changed by the control by the control unit 322, the control unit 322 determines whether operation by the driver is necessary by analyzing the image capture data captured by the image capture device 36.

When, as a result of the determination, an operation by the driver is necessary, the notification unit 323 reads guidance data such as, for example, "Please operate to avoid contact with the interrupting vehicle," from the memory device 32B, and transmits the guidance data to the display device 37 illustrated in FIG. 1 and the loudspeaker driver device (not illustrated).

Information Notification Example 6 by Notification Unit 323

The notification unit 323 may be configured to display, on the display device 37, a path from the vehicle position of the merging vehicle until the merging vehicle merges into the first lane 1-1.

For example, on the basis of the vehicle speed and vehicle position of the merging vehicle, the notification unit 323 calculates the travel route from the vehicle position of the merging vehicle to the merging point, and displays the travel route on the screen of the display device 37 illustrated in FIG. 1.

Thus, the driver is able to ascertain in advance the presence of a merging vehicle even when the control of the first vehicle 3-1 is effected automatically, and hence the driver can prepare for operations such as adjusting the vehicle-to-vehicle distance and lane changes.

Information Notification Example 7 by Notification Unit 323

The notification unit 323 may be configured to give notification of the position of the merging vehicle after the merging vehicle has merged into the first lane 1-1.

For example, on the basis of the vehicle position of the merging vehicle and the vehicle position of the first vehicle 3-1, the notification unit 323 generates image information indicating the respective vehicle positions and displays the image information on the screen of the display device 37 illustrated in FIG. 1.

Thus, the driver is able to check the position of the merging vehicle in relation to the vehicle position of the first vehicle 3-1 because the vehicle position of the merging vehicle is displayed on the head-up display, onboard speedometer, or the like. As a result, driver's line-of-sight movement is reduced, and safe driving is enabled.

Information Notification Example 8 by Notification Unit 323

The notification unit 323 may be configured to give notification of the speed difference between the merging vehicle and the first vehicle 3-1 after the merging vehicle has merged into the first lane 1-1.

For example, the notification unit 323 calculates the speed difference between the vehicle speed of the merging vehicle and the vehicle speed of the first vehicle 3-1, generates image information indicating the calculated speed difference, and displays the image information on the screen of the display device 37 illustrated in FIG. 1.

Thus, even when the control of the first vehicle 3-1 is effected automatically, the driver is able to adjust the vehicle-to-vehicle distance to the merging vehicle merged in front of or behind the first vehicle 3-1 while checking the speed difference displayed on the screen of the display device 37.

Information Notification Example 9 by Notification Unit 323

The notification unit 323 may be configured to give notification as to whether the merging vehicle is ahead of the first vehicle 3-1 or whether the first vehicle 3-1 is ahead of the merging vehicle after the merging vehicle has merged into the first lane 1-1.

For example, on the basis of the vehicle position of the merging vehicle and the vehicle position of the first vehicle 3-1, the control unit 322 determines whether or not the merging vehicle is ahead.

When, as a result of the determination by the control unit 322, a merging vehicle is ahead, the notification unit 323, having received the information on the result of the determination by the control unit 322, reads guidance data such as, for example, "a merging vehicle has merged ahead" from the memory device 32B, and transmits the guidance data to the display device 37 illustrated in FIG. 1 and the loudspeaker driver device (not illustrated).

Furthermore, when the first vehicle 3-1 is ahead, the notification unit 323 reads guidance data such as, for example, "Merging vehicle has merged behind you," from the memory device 32B and transmits the guidance data to the display device 37 illustrated in FIG. 1 and the loudspeaker driver device (not illustrated).

Thus, the guidance is displayed on the display device 37, and the guidance is played back from the loudspeaker driver device (not illustrated). As a result, the driver of the first vehicle 3-1 is able to intuitively grasp the position of the merging vehicle, which reduces driver's line-of-sight movement, and enables safe driving while the driver is aware of the vehicle-to-vehicle distance between the vehicle and the merging vehicle.

Next, the operation of the merging support system 1 will be described with reference to FIGS. 5A to 7B.

FIG. 5A, FIG. 5B, FIG. 5C, FIG. 6A, FIG. 6B, FIG. 7A, and FIG. 7B are flowcharts to illustrate the operation of the merging support system 1.

In step S1, the vehicle-to-vehicle communication device 46 of the first vehicle 3-1 transmits a transmit request signal for vehicle information to the merging vehicle, and then executes the processing of step S2.

In step S2, the vehicle-to-vehicle communication device 46 determines whether or not a response signal to the transmission request signal has been received.

When no response signal has been received (step S2, NO), the vehicle-to-vehicle communication device 46 executes the processing of step S3.

In step S3, the vehicle-to-vehicle communication device 46 determines whether or not a certain period of time has elapsed from the time when the transmission request signal was transmitted.

When a certain period of time has not elapsed (step S3, NO), the vehicle-to-vehicle communication device 46 repeats the processing from step S2 onward.

When a certain period of time has elapsed (step S3, YES), the vehicle-to-vehicle communication device 46 determines that vehicle-to-vehicle communication is difficult.

In this case, because the vehicle-to-vehicle communication device 46 uses onboard detection sensors such as the image capture device 36 and a radar (not illustrated) on board the first vehicle 3-1, the vehicle-to-vehicle communication device 46 requests that the onboard detection sensor process the detection of the vehicle speed, and the like (step S4). The processing of step S5 is then executed.

In step S5, the foregoing onboard detection sensor detects the vehicle speed, and the like, of the merging vehicle and transmits the detected signal for the vehicle speed, and the like, to the merging support device 32. The processing of step S8 is then executed. The processing of step S8 will be described subsequently.

Returning to step S2, upon receiving a response signal before a certain period of time elapses from the time when the transmission request signal is transmitted (step S2, YES), the vehicle-to-vehicle communication device 46 executes the processing of step S6.

In step S6, the vehicle-to-vehicle communication device 46 initiates vehicle-to-vehicle communication and then executes the processing of step S7.

In step S7, the vehicle-to-vehicle communication device 46 receives the vehicle information of the merging vehicle and transfers the received vehicle information to the detection unit 321. The processing of step S8 is then executed.

In step S8, having received the vehicle information, the detection unit 321 detects at least the vehicle speed and vehicle position of the merging vehicle among the received vehicle information, and transmits the detected information about the vehicle speed and vehicle position to the control unit 322.

Having received the information about the vehicle speed and vehicle position, the control unit 322 initiates control of the first vehicle 3-1 corresponding to the behavior when the merging vehicle merges into the first lane 1-1, on the basis of this information. The processing of step S9 illustrated in FIG. 5B is then executed.

Figure 5A:
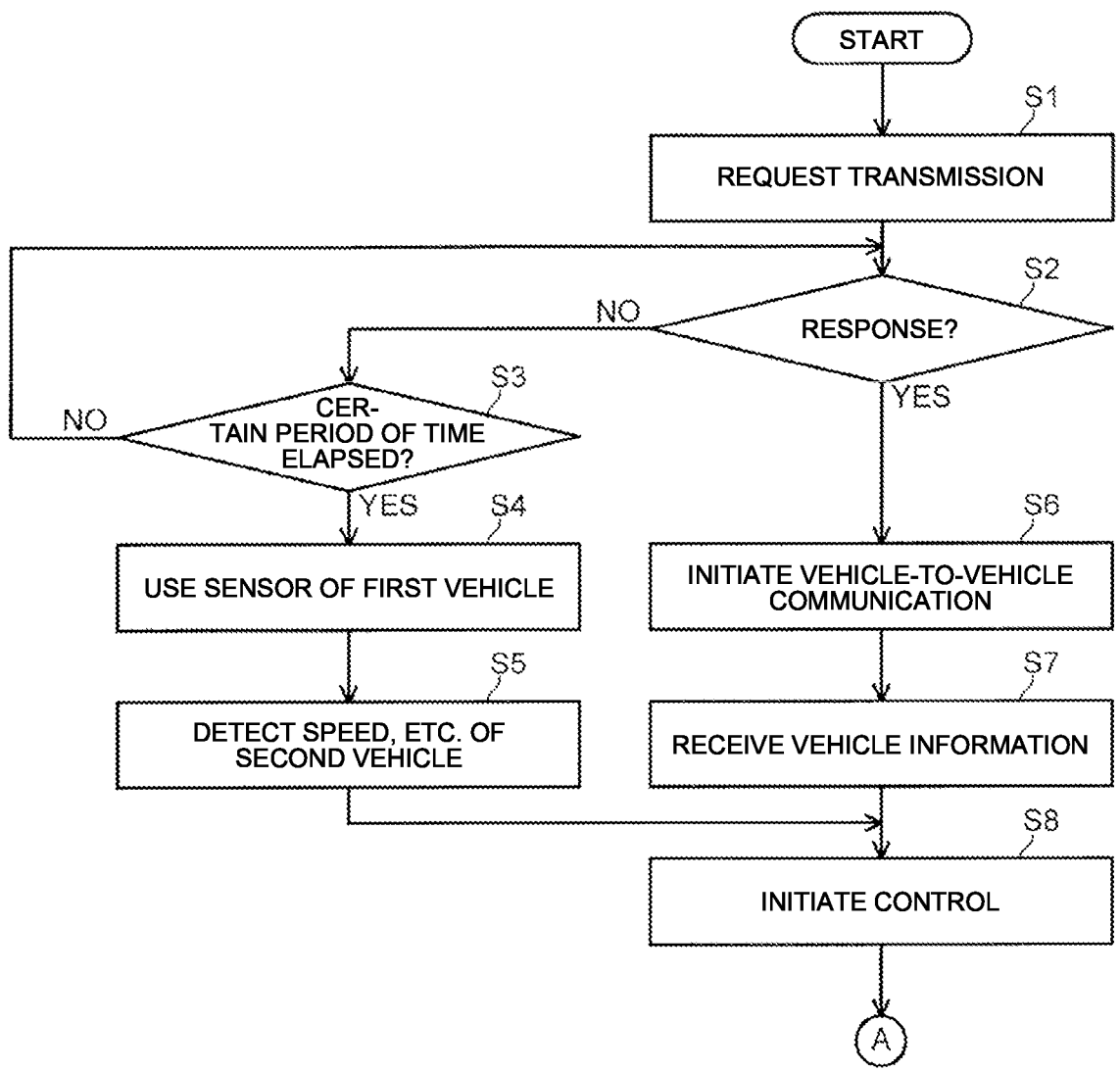
FIG. 5A is a flowchart to illustrate the operation of the merging support system 1.
Figure 5B:
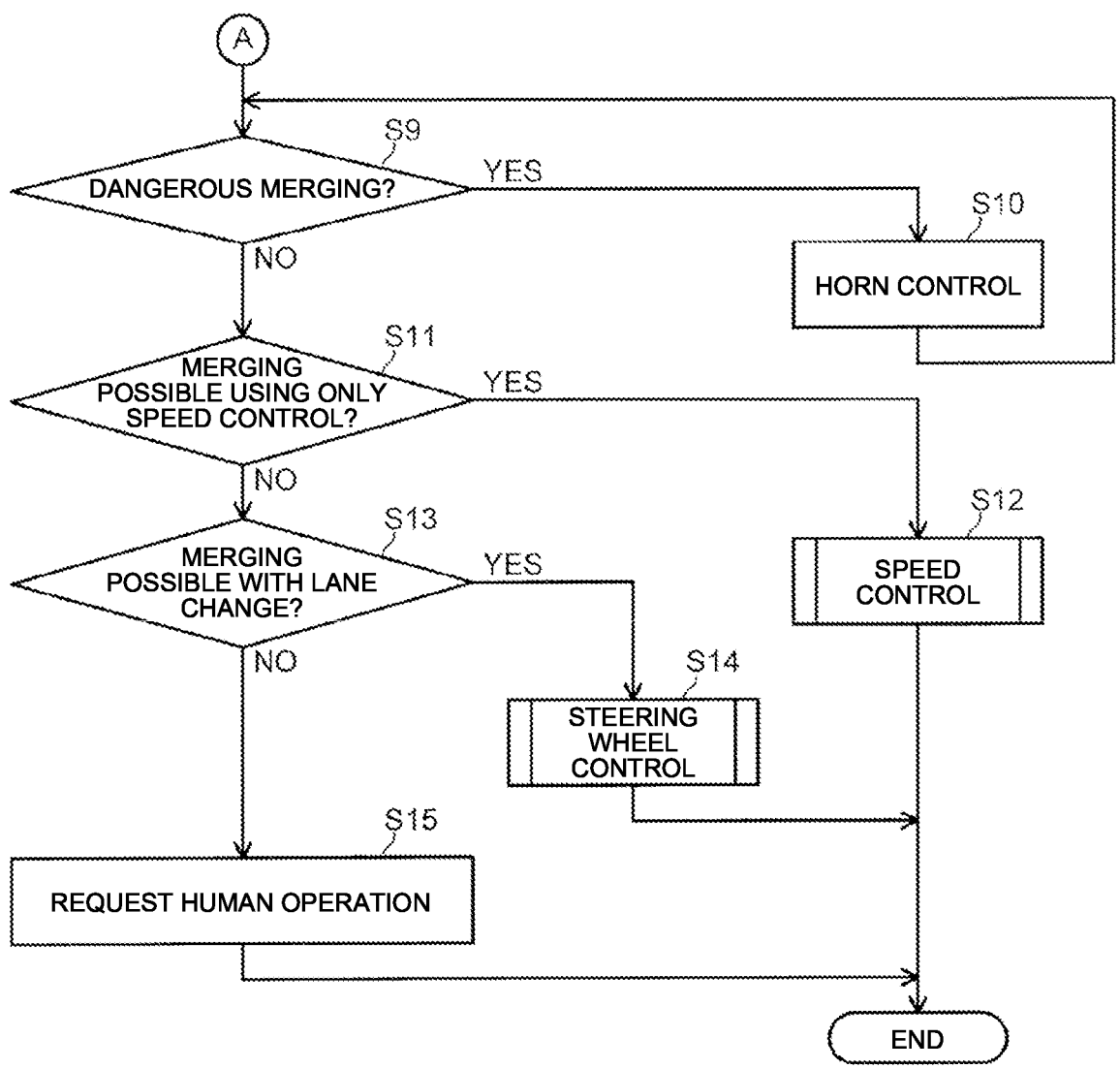
FIG. 5B is a flowchart to illustrate the operation of the merging support system 1.

In step S9 illustrated in FIG. 5B, the control unit 322 determines whether or not there is a possibility of dangerous merging by, for example, detecting sudden acceleration, a sudden steering wheel operation, and the like, of the merging vehicle traveling in the merge lane.

When there is a possibility of dangerous merging (step S9, YES), the control unit 322 executes the processing of step S10.

In step S10, the control unit 322 executes the control to output a horn to alert the merging vehicle that is trying to forcefully interrupt, and then repeats the processing from step S9 onward.

When there is no possibility of dangerous merging (step S9, NO), the control unit 322 executes the processing of step S11.

In step S11, the control unit 322 determines whether it is possible for the merging vehicle to merge only by controlling the speed of the first vehicle 3-1.

When it is determined that the merging vehicle can be merged only using speed control (step S11, YES), the control unit 322 executes the processing relating to speed control of step S12.

The processing relating to speed control will be described with reference to FIGS. 6A and 6B.

Figure 6A:
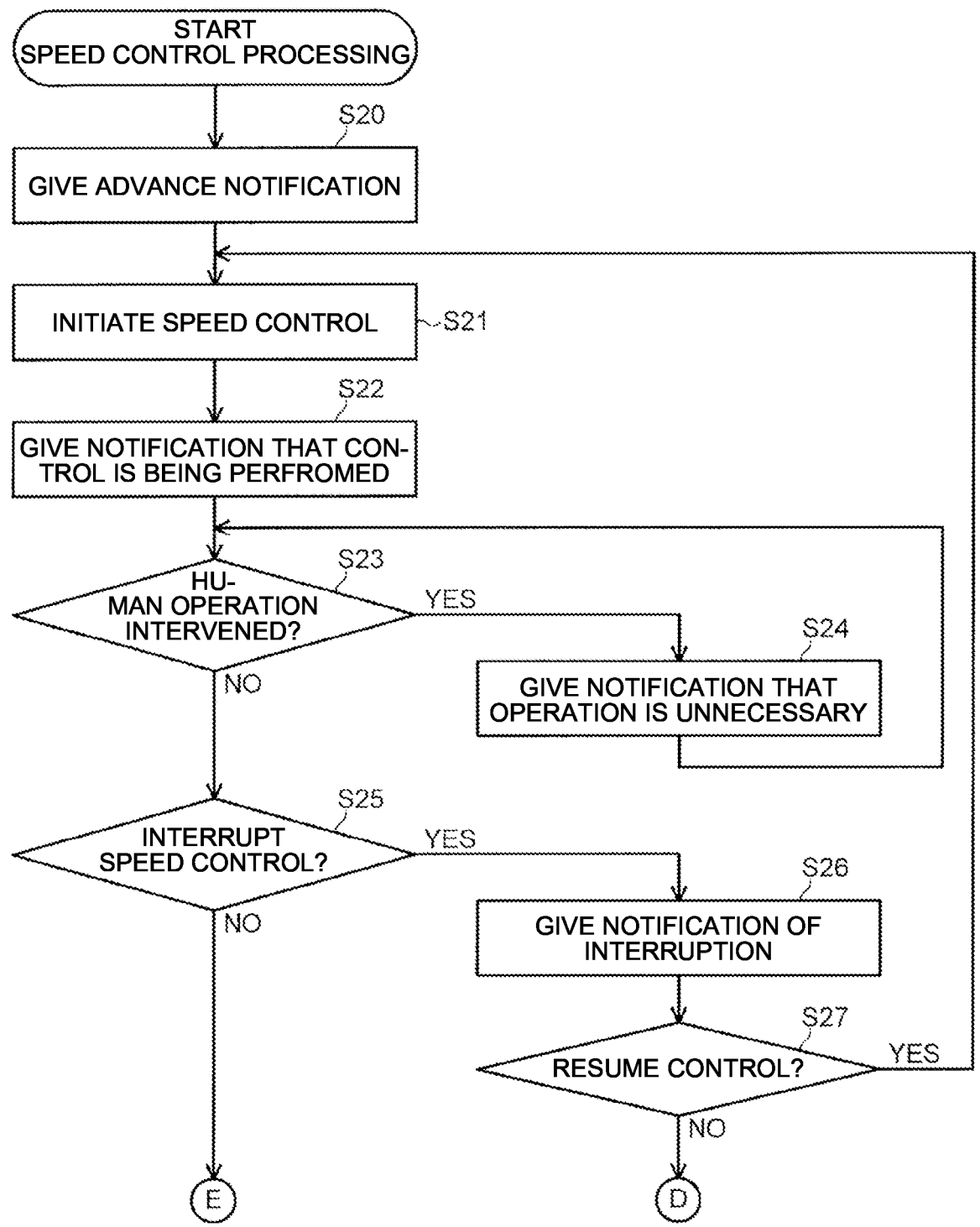
FIG. 6A is a flowchart to illustrate the operation of the merging support system 1.

In step S20 illustrated in FIG. 6A, the notification unit 323 notifies the driver in advance that speed control is to be initiated via the display device 37 illustrated in FIG. 1 and the loudspeaker driver device (not illustrated). The processing of step S21 is then executed.

In step S21, the control unit 322 initiates the speed control. The processing of step S22 is then executed.

In step S22, the notification unit 323 notifies the driver that the speed control is being performed. The processing of step S23 is then executed.

In step S23, the control unit 322 determines whether or not, for example, an erroneous human operation has intervened before a certain period of time has elapsed after the notification in step S22 was executed.

An erroneous human operation is, for example, an operation to depress the brake pedal which is performed immediately after the vehicle 3 automatically starts accelerating, or an operation to increase the depression of the accelerator pedal which is performed immediately after the vehicle 3 automatically starts decelerating.

When an erroneous human operation intervenes (step S23, YES), the processing of step S24 is executed.

In step S24, the notification unit 323 notifies the driver that the operation is unnecessary via the display device 37 illustrated in FIG. 1 and the loudspeaker driver device (not illustrated).

In this case, guidance such as "You are accelerating automatically. No need to operate the accelerator pedal" will be played back. Thereafter, the processing from step S23 onward is repeated.

Returning to step S23, when an erroneous human operation has not intervened (step S23, NO), the processing of step S25 is executed.

In step S25, the notification unit 323 determines whether or not the speed control has been interrupted, for example, by forceful interruption of driving by another vehicle other than the merging vehicle.

When the speed control is interrupted (step S25, YES), the notification unit 323 executes the processing of step S26.

In step S26, the notification unit 323 notifies the driver that the speed control has been interrupted via the display device 37 illustrated in FIG. 1 and the loudspeaker driver device (not illustrated). The processing of step S27 is then executed.

In step S27, the control unit 322 determines whether or not the speed control has resumed, for example, due to the interruption driving being interrupted, while in progress, by another vehicle other than the merging vehicle.

When the vehicle speed control is resumed (step S27, YES), the processing from step S21 onward is repeated.

Figure 6B:
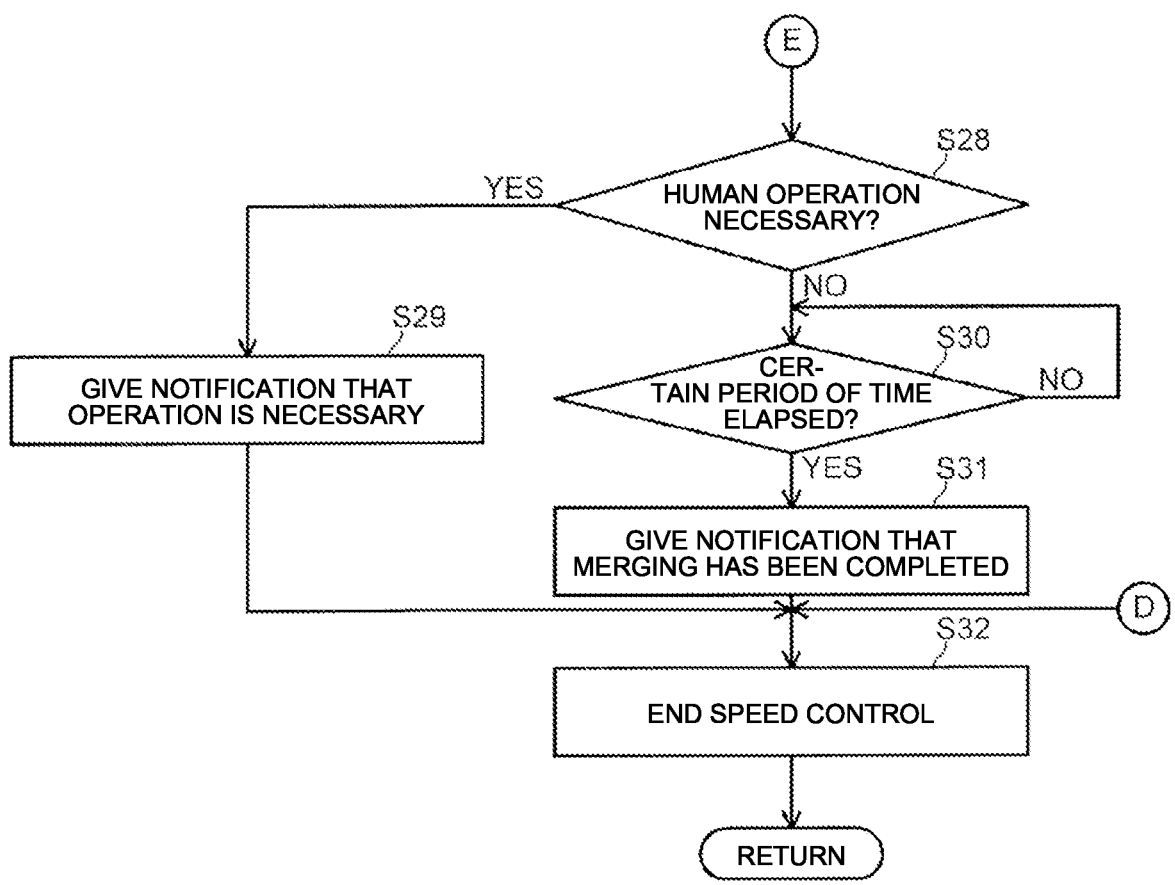
FIG. 6B is a flowchart to illustrate the operation of the merging support system 1.

When the vehicle speed control is not resumed (step S27, NO), the processing of step S32 illustrated in FIG. 6B is executed. The processing of step S32 will be described subsequently.

Returning to step S25, when speed control is not interrupted (step S25, NO), the processing of step S28 illustrated in FIG. 6B is executed.

In step S28 illustrated in FIG. 6B, the notification unit 323 determines whether human operation is necessary when the vehicle speed control by the control unit 322 is being executed.

For example, when the merging vehicle illustrated in FIG. 4 exhibits behavior such as sudden deceleration immediately after merging into the first lane 1-1, for example, the notification unit 323 determines that a human braking operation or the like is necessary. In this case (step S28, YES), the notification unit 323 executes the processing of step S29.

In step S29, the notification unit 323 notifies the driver that human operation is necessary via the display device 37 illustrated in FIG. 1 and the loudspeaker driver device (not illustrated), and then executes the processing of step S32. The processing of step S32 will be described subsequently.

Returning to step S28, for example, when the merging vehicle illustrated in FIG. 4 does not exhibit any behavior such as sudden deceleration immediately after merging into the first lane 1-1, the notification unit 323 determines that human operation is not necessary. In this case (step S28, NO), the processing of step S30 is executed.

In step S30, the notification unit 323 determines whether or not a certain period of time has elapsed from the time when the merging vehicle merged into the first lane 1-1.

When a certain period of time has not elapsed (step S30, NO), the notification unit 323 repeats the processing of step S30.

When a certain period of time has elapsed (step S30, YES), the notification unit 323 executes the processing of step S31.

In step S31, the notification unit 323 notifies the driver that merging has been completed via the display device 37 illustrated in FIG. 1 and the loudspeaker driver device (not illustrated). The processing of step S32 is then executed.

In step S32, the control unit 322 ends the speed control. The serial processing subsequently ends, as illustrated in FIG. 5B.

Returning to step S11 illustrated in FIG. 5B, when it is determined that it is difficult for the merging vehicle to merge by speed control alone (step S11, NO), the control unit 322 executes the processing of step S13.

In step S13, the control unit 322 determines whether it is possible for the merging vehicle to merge by changing lanes.

When it is determined that the merging vehicle can merge by changing lanes (step S13, YES), the control unit 322 executes the processing relating to steering wheel control in step S14. Details of steering wheel-related processing will be described subsequently.

When it is determined that it is difficult for the merging vehicle to merge using a lane change (step S13, NO), the control unit 322 executes the processing of step S15.

In step S15, the notification unit 323 notifies the driver that human operation is necessary via the display device 37 illustrated in FIG. 1 and the loudspeaker driver device (not illustrated), and then the serial processing ends.

Next, processing related to steering wheel control will be described with reference to FIGS. 7A and 7B.

Figure 7A:
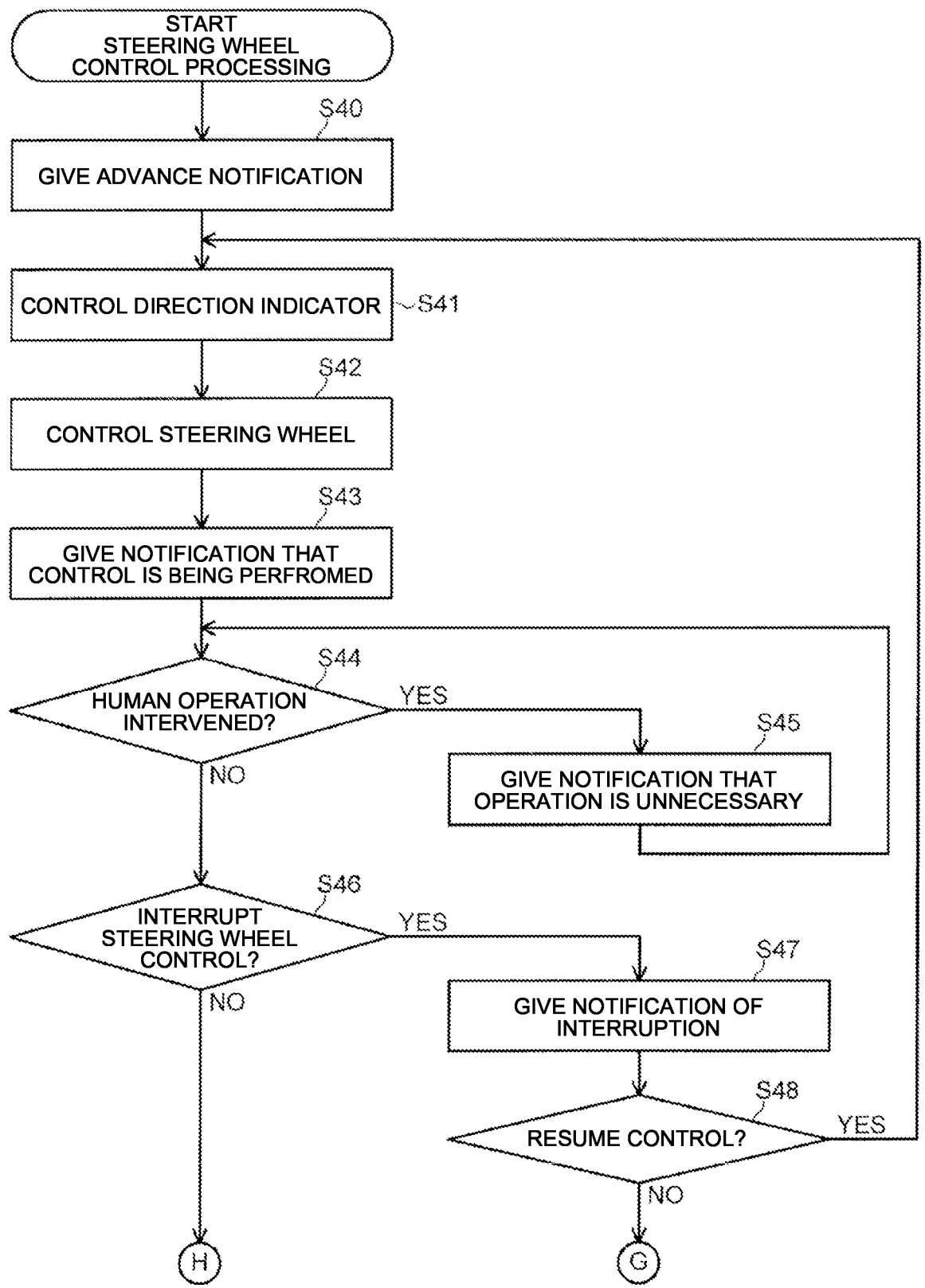
FIG. 7A is a flowchart to illustrate the operation of the merging support system 1.

In step S40 illustrated in FIG. 7A, the notification unit 323 notifies the driver in advance that the steering wheel control is to be started via the display device 37 illustrated in FIG. 1 and the loudspeaker driver device (not illustrated). The processing of step S41 is then executed.

In step S41, the control unit 322 initiates control of the direction indicators. The processing of step S42 is then executed.

In step S42, the control unit 322 initiates steering wheel control. The processing of step S43 is then executed.

In step S43, the notification unit 323 notifies the driver that steering wheel control is being performed via the display device 37 illustrated in FIG. 1 and the loudspeaker driver device (not illustrated). The processing of step S44 is then executed.

In step S44, the control unit 322 determines whether or not, for example, an erroneous human operation has intervened before a certain period of time has elapsed after the notification in step S43 was executed.

An erroneous human operation is, for example, an operation with which the steering wheel is maintained in a neutral position, which is performed immediately after a lane change is automatically initiated.

When an erroneous human operation intervenes (step S44, YES), the processing of step S45 is executed.

In step S45, the notification unit 323 notifies the driver that the operation is unnecessary via the display device 37 illustrated in FIG. 1 and the loudspeaker driver device (not illustrated).

In this case, guidance such as "An automatic lane change is being performed. There is no need to operate the steering wheel." is played back. Thereafter, the processing from step S44 onward is repeated.

Returning to step S44, when an erroneous human operation has not intervened (step S44, NO), the processing of step S46 is executed.

In step S46, the notification unit 323 determines whether or not the steering wheel control has been interrupted, for example, by forceful interruption of driving by another vehicle other than the merging vehicle.

When the steering wheel control is interrupted (step S46, YES), the notification unit 323 executes the processing of step S47.

In step S47, the notification unit 323 notifies the driver that steering wheel control has been interrupted via the display device 37 illustrated in FIG. 1 and the loudspeaker driver device (not illustrated). The processing of step S48 is then executed.

In step S48, the notification unit 323 determines whether or not the steering wheel control has resumed, for example, due to the interruption driving being interrupted, while in progress, by another vehicle other than the merging vehicle.

When the steering wheel control is resumed (step S48, YES), the processing from step S41 onward is repeated.

Figure 7B:
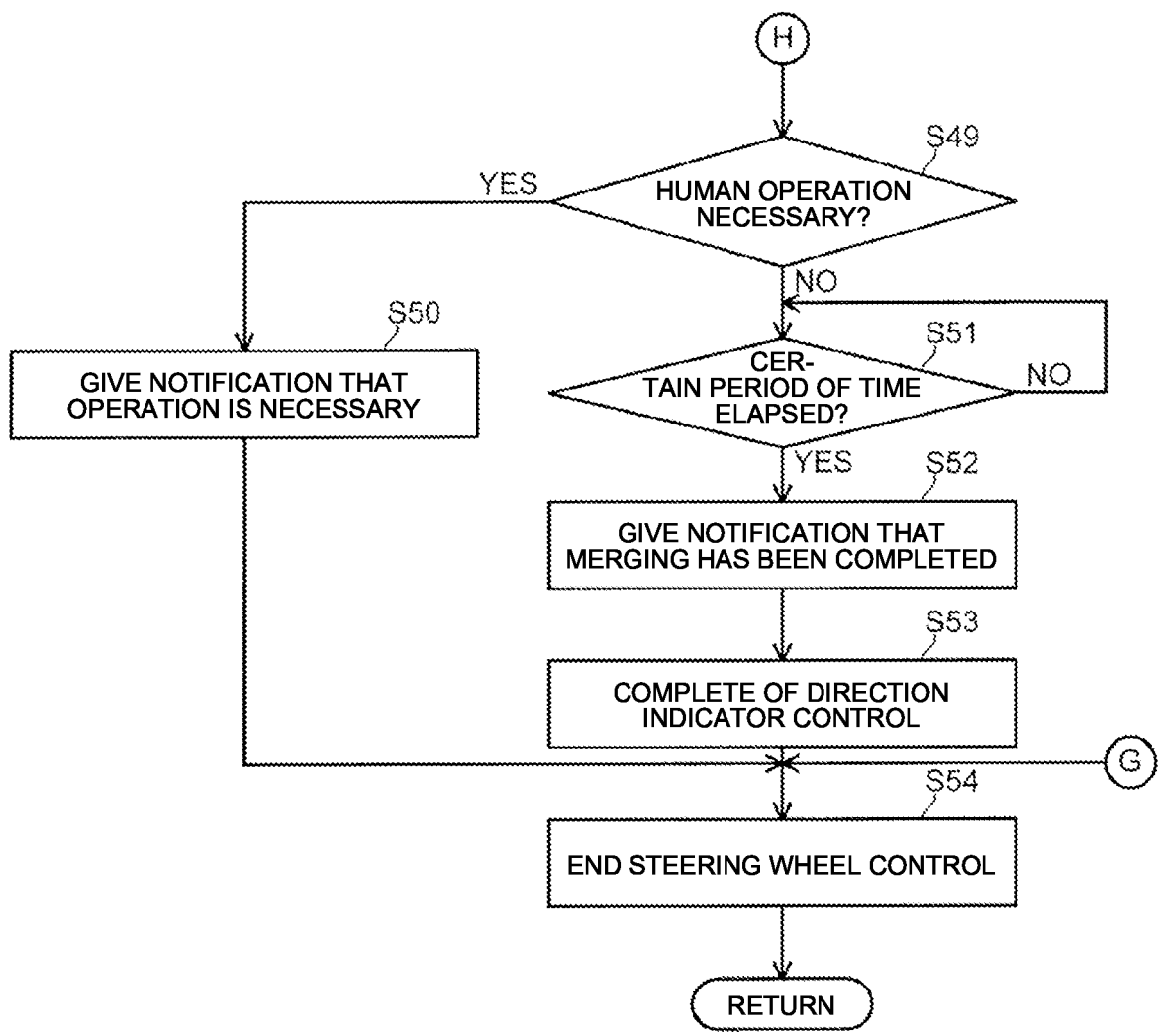
FIG. 7B is a flowchart to illustrate the operation of the merging support system 1.

When the steering wheel control is not resumed (step S48, NO), the processing of step S54 illustrated in FIG. 7B is executed. The processing of step S54 will be described subsequently.

Returning to step S46, when steering wheel control is not interrupted (step S46, NO), the processing of step S49 illustrated in FIG. 7B is executed.

In step S49 illustrated in FIG. 7B, the notification unit 323 determines whether human operation is necessary when the steering wheel control by the control unit 322 is being executed.

For example, when the merging vehicle illustrated in FIG. 4 exhibits behavior such as sudden deceleration immediately after merging into the first lane 1-1, for example, the notification unit 323 determines that a human braking operation or the like is necessary. In this case (step S49, YES), the notification unit 323 executes the processing of step S50.

In step S50, the notification unit 323 gives notification that human operation is necessary and then executes the processing of step S54. The processing of step S54 will be described subsequently.

Returning to step S49, for example, when the merging vehicle illustrated in FIG. 4 does not exhibit any behavior such as sudden deceleration immediately after merging into the first lane 1-1, the notification unit 323 determines that a human steering wheel operation or the like is not necessary. In this case (step S49, NO), the processing of step S51 is executed.

In step S51, the notification unit 323 determines whether or not a certain period of time has elapsed from the time when the merging vehicle merged into the first lane 1-1.

When a certain period of time has not elapsed (step S51, NO), the notification unit 323 repeats the processing of step S51.

When a certain period of time has elapsed (step S51, YES), the notification unit 323 executes the processing of step S52.

In step S52, the notification unit 323 notifies the driver that merging has been completed via the display device 37 illustrated in FIG. 1 and the loudspeaker driver device (not illustrated). The processing of step S53 is then executed.

In step S53, the control unit 322 ends control of the direction indicators and then executes the processing of step S54.

In step S54, the control unit 322 ends steering wheel control. The serial processing subsequently ends, as illustrated in FIG. 5B.

Note that the merging support device 32 according to the present embodiment may be configured to use the aforementioned onboard detection sensor such as radar to attempt to acquire vehicle information on the merging vehicle, and then, when the vehicle information cannot be acquired by the onboard detection sensor, to acquire the vehicle information by vehicle-to-vehicle communication.

Note that the merging support system and the merging support device 32 according to the present embodiment may be configured to perform vehicle control and notification control by using vehicle information transmitted between a plurality of vehicles 3 via the center server 5. In this case, the center server 5 collects information on the vehicle speed and the vehicle position transmitted from the second vehicle and transmits the information to the first vehicle.

Thus, control of the first vehicle corresponding to the behavior when the second vehicle merges into the first lane can be executed on the basis of the information transmitted from the vehicle 3 which does not have the vehicle-to-vehicle communication device 46 built in.

As described hereinabove, the merging support device 32 according to the embodiment of the present disclosure is configured, when executing control of the first vehicle that corresponds to the behavior when the second vehicle merges into the first lane, to inform the driver of the first vehicle of information on the control content of the first vehicle before the control is initiated, during the execution of the control, or after the control is completed.

This configuration enables the driver to ascertain that the vehicle control is to be executed as the second vehicle merges into the first lane, thus reducing driver anxiety about the control.

Various embodiments have been described hereinabove with reference to the drawings, but it is understood that the present disclosure is not limited to or by the relevant examples. It is clear that a person skilled in the art could conceive of various modification examples or revision examples within the scope disclosed in the present disclosure, which are naturally understood to belong to the technical scope of the present disclosure. In addition, each of the constituent elements of the foregoing embodiments may also be arbitrarily combined within a scope not departing from the spirit of the present disclosure.

Although specific examples of the present disclosure are described in detail hereinabove, such examples are merely illustrative and do not limit the scope of the claims. The technology disclosed in the claims may include various variations and modifications of the specific examples illustrated in this disclosure.

According to an example of the present disclosure, it is possible to provide a merging support device, a merging support system, a merging support method, and a computer-readable medium that enable speed adjustment without causing a driver anxiety when a merging vehicle merges.

Further advantages and effects of one modification example of the present disclosure will be apparent from the specification and drawings. The advantages and/or effects are provided respectively by the features described in some embodiments and in the specification and drawings, but not necessarily all thereof are provided in order to obtain one or more identical features.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A merging support device comprising:
   a memory; and
   a hardware processor coupled to the memory, wherein the hardware processor is configured to:
   execute control of a first vehicle, the control corresponding to behavior of the first vehicle when a second vehicle merges into a first lane, based on a vehicle speed and a vehicle position of the second vehicle traveling in a second lane that merges into a first lane in which the first vehicle is traveling;
   notify a driver of the first vehicle about information on a control content of the first vehicle by the hardware processor; and
   display, on a display device mounted in the first vehicle, a path traveled by the second vehicle until the second vehicle merges into the first lane.

2. The merging support device according to claim 1, wherein, the hardware processor is configured to make notification of the information on the control content of the first vehicle, before the control of the first vehicle corresponding to the behavior of the first vehicle when the second vehicle merges into the first lane is initiated.

3. The merging support device according to claim 1, wherein the hardware processor is configured to give notification of the information on the control content of the first vehicle, after the control of the first vehicle corresponding to the behavior of the first vehicle when the second vehicle merges into the first lane is initiated.

4. The merging support device according to claim 1, wherein the hardware processor is configured to give notification of information indicating that the control of the first vehicle has been interrupted, in a case where the control of the first vehicle is interrupted after the control of the first vehicle corresponding to the behavior of the first vehicle when the second vehicle merges into the first lane is initiated.

5. The merging support device according to claim 1, wherein the hardware processor is configured to give notification of information indicating that an operation by the driver of the first vehicle has intervened in a case where the operation intervenes after the control of the first vehicle corresponding to the behavior of the first vehicle when the second vehicle merges into the first lane is initiated.

6. The merging support device according to claim 1, wherein the hardware processor is configured to give notification that an operation by the driver of the first vehicle is necessary in a case where it is determined that the operation is necessary after the control of the first vehicle is initiated.

7. The merging support device according to claim 1, wherein the hardware processor is configured to give notification of a position of the second vehicle after the second vehicle has merged into the first lane.

8. The merging support device according to claim 1, wherein the hardware processor is configured to give notification of a speed difference between the first vehicle and the second vehicle after the second vehicle has merged into the first lane.

9. The merging support device according to claim 1, wherein the hardware processor is configured to cause a direction indicator of the first vehicle to flash as the control of the first vehicle, the control corresponding to the behavior of the first vehicle when the second vehicle merges into the first lane.

10. The merging support device according to claim 1, wherein the hardware processor is configured to turn on a brake lamp of the first vehicle as the control of the first vehicle, the control corresponding to the behavior of the first vehicle when the second vehicle merges into the first lane.

11. The merging support device according to claim 1, wherein the hardware processor is configured to activate a horn of the first vehicle as the control of the first vehicle, the control corresponding to the behavior of the first vehicle when the second vehicle merges into the first lane.

12. The merging support device according to claim 1, wherein the hardware processor is configured to perform a lane change of the first vehicle as the control of the first vehicle, the control corresponding to the behavior of the first vehicle when the second vehicle merges into the first lane.

13. The merging support device according to claim 1, wherein the hardware processor is configured to change a vehicle speed of the first vehicle as the control of the first vehicle, the control corresponding to the behavior of the first vehicle when the second vehicle merges into the first lane.

14. The merging support device according to claim 1, wherein the hardware processor is further configured to detect a speed and a position of the second vehicle, based on vehicle information transmitted using wireless communication from the second vehicle.

15. A merging support system comprising:
   the merging support device according to claim 1; and
   a center server that collects information on the vehicle speed and the vehicle position transmitted from the second vehicle and transmits the information to the first vehicle.

16. A merging support method comprising:
   detecting, by a hardware processor, a vehicle speed and a vehicle position of a second vehicle traveling in a second lane that merges into a first lane in which a first vehicle is traveling;
   executing, by the hardware processor, control of the first vehicle, the control corresponding to behavior of the first vehicle when the second vehicle merges into the first lane, based on the vehicle speed and the vehicle position of the second vehicle;

notifying, by the hardware processor, a driver of the first vehicle about information on a control content of the first vehicle; and displaying, by the hardware processor, on a display device mounted in the first vehicle, a path traveled by the second vehicle until the second vehicle merges into the first lane.

17. A non-transitory computer-readable medium on which an executable program is recorded, the program, when executed by a computer including a hardware processor, performs operations including:

detecting a vehicle speed and a vehicle position of a second vehicle traveling in a second lane that merges into a first lane in which a first vehicle is traveling;

executing control of the first vehicle, the control corresponding to behavior of the first vehicle when the second vehicle merges into the first lane, based on the vehicle speed and the vehicle position of the second vehicle;

notifying a driver of the first vehicle about information on a control content of the first vehicle; and displaying, on a display device mounted in the first vehicle, a path traveled by the second vehicle until the second vehicle merges into the first lane.

* * * * *